(12) United States Patent
Bartholomew et al.

(10) Patent No.: US 7,843,898 B1
(45) Date of Patent: Nov. 30, 2010

(54) SELECTIVE BANDWIDTH CONNECTIVITY THROUGH NETWORK LINE CARDS

(75) Inventors: Dale L. Bartholomew, Vienna, VA (US);
John M. Carman, Alexandria, VA (US);
David H. Cave, Fairfax, VA (US);
Robert D. Farris, Sterling, VA (US);
George Korsanos, Bronx, NY (US);
Michael G. Pilkerton, Fairfax, VA (US);
R. Andrew Poole, Ashburn, VA (US);
Kamran Sistanizadeh, Arlington, VA (US); Albert F. Valeo, Westbury, NY (US)

(73) Assignee: Verizon Services Corp., Ashburn, VA (US)

( * ) Notice: Subject to any disclaimer, the term of this patent is extended or adjusted under 35 U.S.C. 154(b) by 0 days.

(21) Appl. No.: 09/144,635

(22) Filed: Aug. 31, 1998

(51) Int. Cl.
*H04L 12/66* (2006.01)

(52) U.S. Cl. .................... 370/352; 370/395.2

(58) Field of Classification Search ............. 370/395.1, 370/395.2, 395.21, 395.41, 395.52, 395.6, 370/248, 24, 351, 352, 353, 308, 249, 354, 370/355, 356; 379/243, 327
See application file for complete search history.

(56) References Cited

U.S. PATENT DOCUMENTS

| | | | | |
|---|---|---|---|---|
| 3,567,865 A | * | 3/1971 | Chu et al. | 370/388 |
| 4,143,242 A | * | 3/1979 | Horiki | 370/545 |
| 4,472,798 A | * | 9/1984 | Hafer | 370/248 |
| 5,085,913 A | * | 2/1992 | Wong | 428/76 |
| 5,111,497 A |   | 5/1992 | Bliven et al. | |
| 5,287,348 A | * | 2/1994 | Schmidt | 370/352 |
| 5,592,475 A | * | 1/1997 | Gliga et al. | 370/359 |
| 5,610,910 A |   | 3/1997 | Focsaneanu et al. | |
| 5,692,043 A | * | 11/1997 | Gliga | 379/327 |
| 5,825,868 A | * | 10/1998 | Diamond | 379/243 |

(Continued)

OTHER PUBLICATIONS

AT&T (now Lucent) Production Specification 235-900-111 of 1995.

(Continued)

*Primary Examiner*—Ricky Ngo
*Assistant Examiner*—Christine Ng

(57) ABSTRACT

Public communication networks increasingly need to provide customers with a range of communication services, from baseband voice service, to computer data communications, to high speed digital data communications for multimedia and the like. Many such services would be blocked by existing telephone network line cards, which provide coding and decoding (CODEC) between analog and digital signals and process digital signals only at a relatively low, fixed bit rate. In accord with the invention, intelligent signal detection and control added to a line card selectively bypasses the CODEC and the associated connection to a time slot limited telephone exchange. The selective bypass connection provides a connection to an alternative network functionality capable of providing higher bandwidth digital services. In the preferred embodiment, the bypass provides a connection through an adaptive digital signal processor with a programmed controller. The digital signal processor provides coding and decoding functions, adapted to the particular communication service requested and the physical level signal protocol used over the customer's line. The digital signal processor also provides a two-way digital communication link to a relatively fast data switch, such as an edge device of an asynchronous transport mode (ATM) network. The data switch and associated data network provide a full range of digital communication services of various bandwidths or bit rates as may be requested by individual.

30 Claims, 9 Drawing Sheets

U.S. PATENT DOCUMENTS

| | | | | |
|---|---|---|---|---|
| 6,035,020 | A * | 3/2000 | Weinstein et al. | 379/93.09 |
| 6,083,280 | A * | 7/2000 | Eitel | 717/158 |
| 6,163,599 | A * | 12/2000 | McHale | 379/93.28 |
| 6,259,699 | B1 * | 7/2001 | Opalka et al. | 370/398 |
| 6,314,102 | B1 * | 11/2001 | Czerwiec et al. | 370/395.6 |
| 6,480,487 | B1 * | 11/2002 | Wegleitner et al. | 370/354 |
| 6,760,766 | B1 * | 7/2004 | Sahlqvist | 709/227 |

OTHER PUBLICATIONS

AT&T (now Lucent) System Description 235-100-125 of 1995.

Applied Signal Technology, Model 330/330NT Digital Signal Distribution Unit.

National Semiconductor Corp. From POTS to ADSL, new Subscriber-Loop Technologies Deliver Bandwidth Closer to Home, pp. 1-5.

"Why Consider Using DSL?" p. 1.

Westell: Ansychronous Transfer Mode (ATM) over Asymmetric Digital Subscriber Line (ADSL) Tutorial, pp. 1-2.

FlexCap2 Rate Adaptive Digital Subscriber Line (RADSL), pp. 1-4.

Westell, Inc. Signs Agreement with Bell Atlantic to Supply ADSL Equipment, pp. 1-2.

* cited by examiner

Line Unit Organization (1 of 4)

Line Unit Organization (2 of 4)

Line Unit Organization (3 of 4)

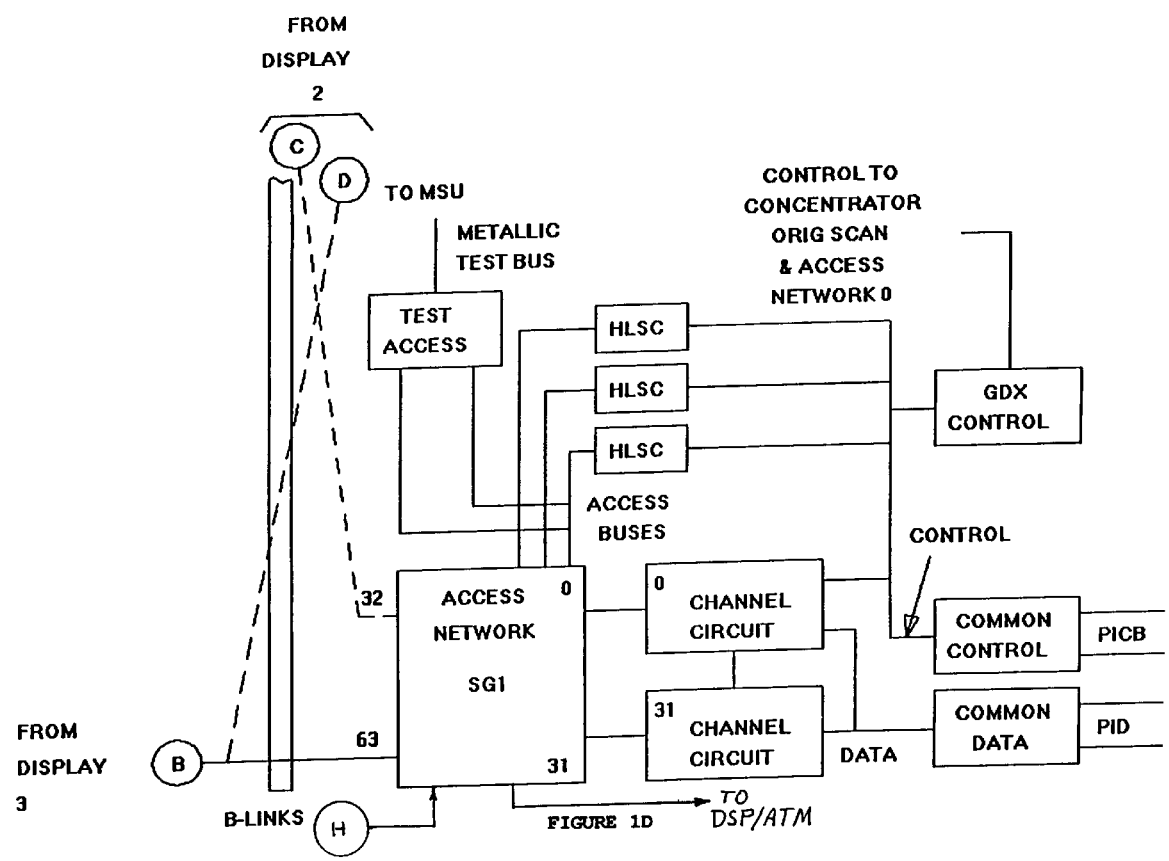

SELECTIVE BANDWIDTH CONNECTIVITY THROUGH NETWORK LINE CARDS

TECHNICAL FIELD

The present invention relates to a method and system for providing enhanced performance from a public telecommunications network, and more particularly to a means and methodology for providing selective bandwidth connectivity through network line cards in Public Switched Telephone Networks.

ACRONYMS

The written description uses a large number of acronyms to refer to various services, messages and system components. Although generally known, use of several of these acronyms is not strictly standardized in the art. For purposes of this discussion, acronyms therefore will be defined as follows:
- AMA—Automatic Message Accounting
- ATM—Asynchronous Transfer Mode
- CODEC—Coding and decoding functions for conversion between analog and digital signals
- COT—Central Office Terminal
- DS—A hierarchy of digital signal speeds
- DS0—DS level 0
- DS1—DS level 1
- DSP—Digital Signal Processor
- FCC—False Cross and Ground
- GDX—Gated Diode Cross-Point
- HLSC—High-Level Service Circuit
- ITU—International Telecommunications Union
- LU—Line Unit
- MDF—Main Distribution Frame
- NID—Network Interface Device
- PBX—Private Branch Exhange
- PCM—Pulse Code Modulation
- PSTN—Public Switched Telephone Network
- RAC—Revenue Accounting Office
- SG—Service Group
- SLC—Subscriber Loop Carrier

BACKGROUND

The Public Switched Telephone Network (PSTN) in the United States, which has effectively provided service to business and the general public, is now facing new problems as it responds to consumer desires as the consumer adapts to new technologies. Among the changes impacting the industry are changes in usage habits of the end users. In the relatively recent past the operating telephone companies (Telco's) could reliably expect the user public to consistently use a one to two minute holding time for each telephone call completed through the network. This could then be relied upon to rate and engineer the network. At the same time it could be expected that the bandwidth needs of the subscriber public could be met by existing switch technology. Generally, this has comprised analog service through a line card or line unit (LU) and an end office switch. The analog voiceband channels (4 kHZ nominal) are digitized by the CODEC (coder/decoder) on the line card to create 64 kb/s DS level 0 (DS0) signals. Twenty-four of these DS0 channels from the CODECs are multiplexed by a channel bank to create a 1.544 Mb/s DS1 channel. A number of these DS1 channels are then digitally switched through the telecommunications network. The line card performs the analog to digital conversion at a sampling rate of 8,000 times a second. This is then sent over 64 kilobit per second (kb/s) time slots through the switch fabric and then on into the network for termination.

This plan and methodology provided relative stability for an extended period of time. The calls were 1-2 minute calls whose time of occurrence was subject to estimation. However in the last several years there has been exponential growth in use of the Internet, where the hold time may be measured in hours. In addition, modern public communication networks increasingly need to provide customers with a range of communication services, from baseband voice service, to computer data communications, to high speed digital data communications for multimedia and the like. Yet many such services are seriously impeded or virtually blocked by existing telephone network line cards. These provide coding and decoding (CODEC) functions between analog and digital signals, and process digital signals only at the relatively low, fixed bit rate.

It is now commonplace to use computers or PC's as a medium for voice communication over long distances via the PSTN and access to the Internet. However because of the coding function, the channel is still restricted by the 64 kb/s limitation at the line card or line unit. Regardless of the ultimate capabilities of exchange switches such as the AT&T (now Lucent) 5ESS, their limit for practical purposes is artificially restricted by present day network architecture and practices.

From the point of view of the local exchange carrier, data traffic creates a variety of problems.

For example, the long hold times tie up network resources. Also, the dialing patterns are not random. Large numbers of calls go through one or a small number of end offices to an Internet Service Provider's modem pool, placing an inordinate load on the terminating office and the trunks to that office. Reengineering the voice telephone network, just to meet the demand for added resources is already imposing heavy costs on local exchange carriers.

It is a primary object of the present invention to ameliorate these problems in the existing Public Switched Telephone Network.

DISCLOSURE OF THE INVENTION

It is a basic purpose of the invention to transform the line card from an obstacle and impediment into a means of providing an advantageous solution to a large part of this problem. In accord with the invention, intelligent signal detection and control is incorporated in a line card to selectively bypass the CODEC and conventional connection to a time slot exchange. The selective bypass provides connection to an alternative network functionality which is capable of providing higher bandwidth digital services. In the preferred embodiment, the bypass provides a connection through an adaptive digital signal processor with a programmed controller. The digital signal processor provides coding and decoding functions adapted to the particular communication service requested, and the physical level signal protocol used over the customer's line. The digital signal processor also provides a two-way digital communication link to a relatively fast data switch, such as an edge device of an asynchronous transport mode (ATM) network. The data switch and associated data network provide a full range of digital communication services of various bandwidths or bit rates as may be requested by individual subscribers. The selective bypass at the line card also off-loads the data traffic from the voice telephone network, reducing the burden on the switch and trunk resources of that network.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

The drawing figures depict the present invention by way of example, not by way of limitations. In the figures, like reference numerals refer to the same or similar elements.

FIGS. 1A-D show a functional block diagram of a line unit or LU in accord with the invention.

BEST MODE FOR CARRYING OUT THE INVENTION

By way of background, a summary description of the basic telephone call processing elements of a line unit is here provided. The description is based on an AT&T (now Lucent) Product Specification 235-900-111 of 1995 and System Description 235-100-125 of 1995. A modified version of such a unit is depicted in FIGS. 1A-D, and a typical interoffice telephone call flow through the elements of the line unit is depicted in FIGS. 2A-D. Persons skilled in the art will recognize that the illustrated line unit is an example only. The principles of the invention are readily adaptable to line units intended for use with a variety of telephone systems available from different manufacturers, including CO and PBX switches, remote terminals of loop carrier systems, optical network units, etc.

The line unit or LU connects to a number of subscriber lines through a main distribution frame (MDF). The LU provides the local customer interface to a 5ESS(R)-2000 switch for single-party, multiparty, coin, and certain private branch exchange (PBX) lines. It may be used to terminate subscribers within 18 KFT loop length, or subscribers on universal SLC(R) carrier systems [for example, SLC(R) 5, SLC(R) 96] through a central office terminal (COT). A functional block diagram of such an LU is shown in FIGS. 1A-D.

Each LU consists of an analog space division line concentrator capable of terminating a maximum of 640 customers (portions shown in FIGS. 1A and 1C), and 2 SOs of customer interface hardware. Each SO contains enough customer interface hardware to accommodate 32 active calls. The customer interface hardware provides the signaling, control, and speech interface to the 5ESS(R)-2000 switch. The output of the LU is 54 time slots to the MCTU.

The LU performs the following functions necessary to interface to analog lines.
   a. Analog space division line concentration (10:1, 8:1, 6:1, 4:1)
   b. Origination scanning
   c. BORSCHT functions
      1. Battery feed
      2. Overvoltage protection
      3. Ringing
      4. Supervisory functions
      5. Coder/decoder (CODEC) analog-to-digital conversions
      6. Hybrid (2-wire to 4-wire conversion)
      7. Test access.

Figure 1A:
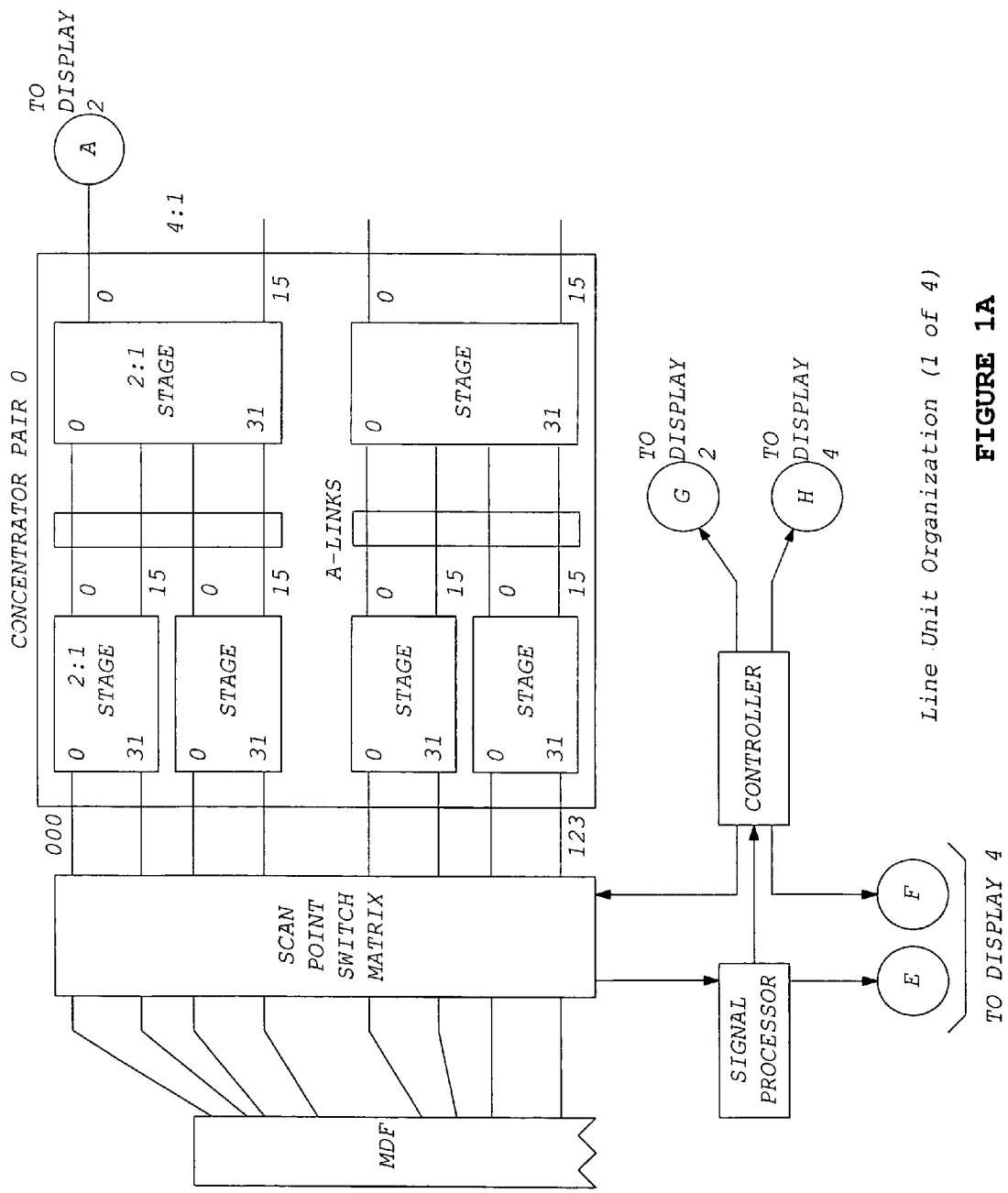
Figure 1B:
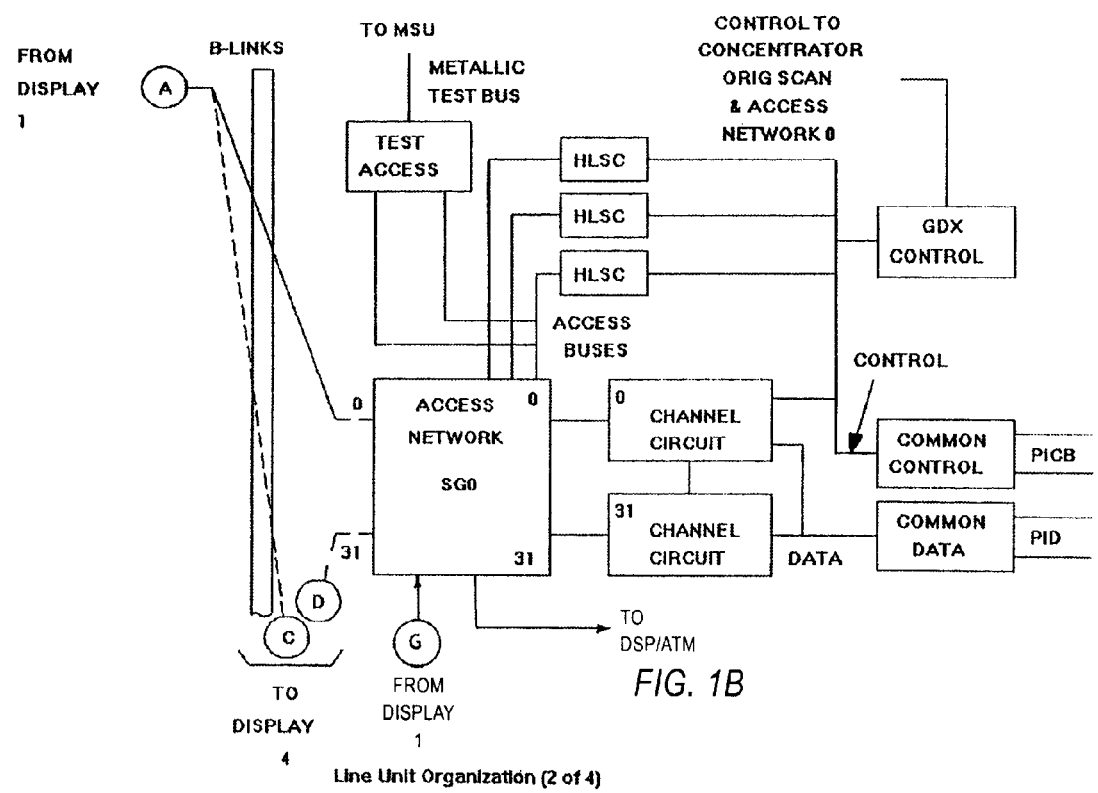

The LU is divided into two SOs. As shown in FIGS. 1B and 1D each SO consists of the following hardware:
   a. Common control and data circuits
   b. Access network (SG0, SG1)
   c. High-level service circuits (HLSCs)
   d. Channel circuits.

The LU also contains a concentrator network that is shared by both of the service groups.

Concentration

A line concentrator provides the customer with switched access to the 5ESS(R)-2000 switch. Concentration of customer inputs is provided to interface relatively low-usage ports to the relatively high-usage channels. The concentration ratio (number of ports per number of channels) is adjustable and can be tailored to the specific customer activity in any given central office.

Figure 1C:
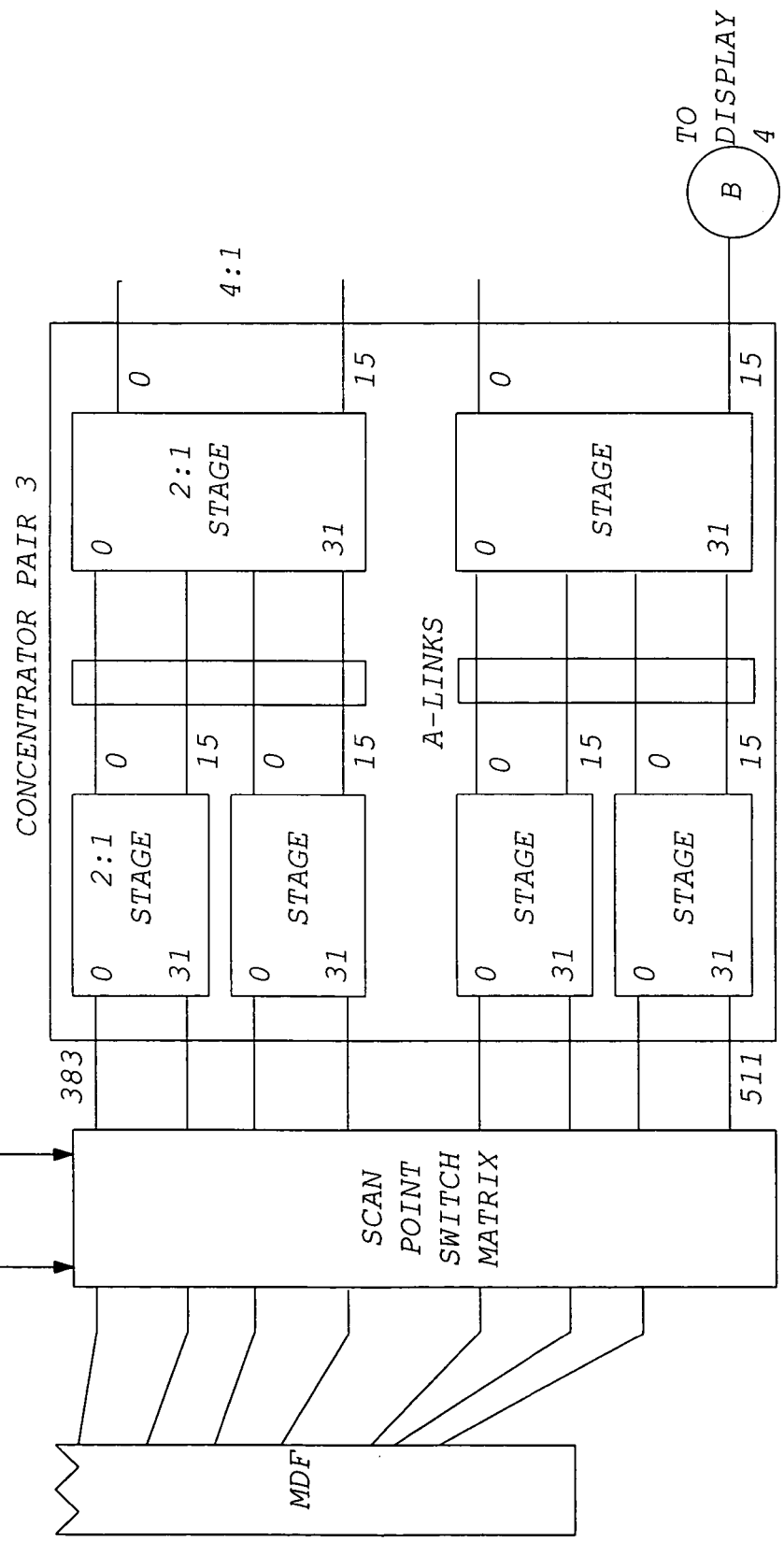
Figure 2A:
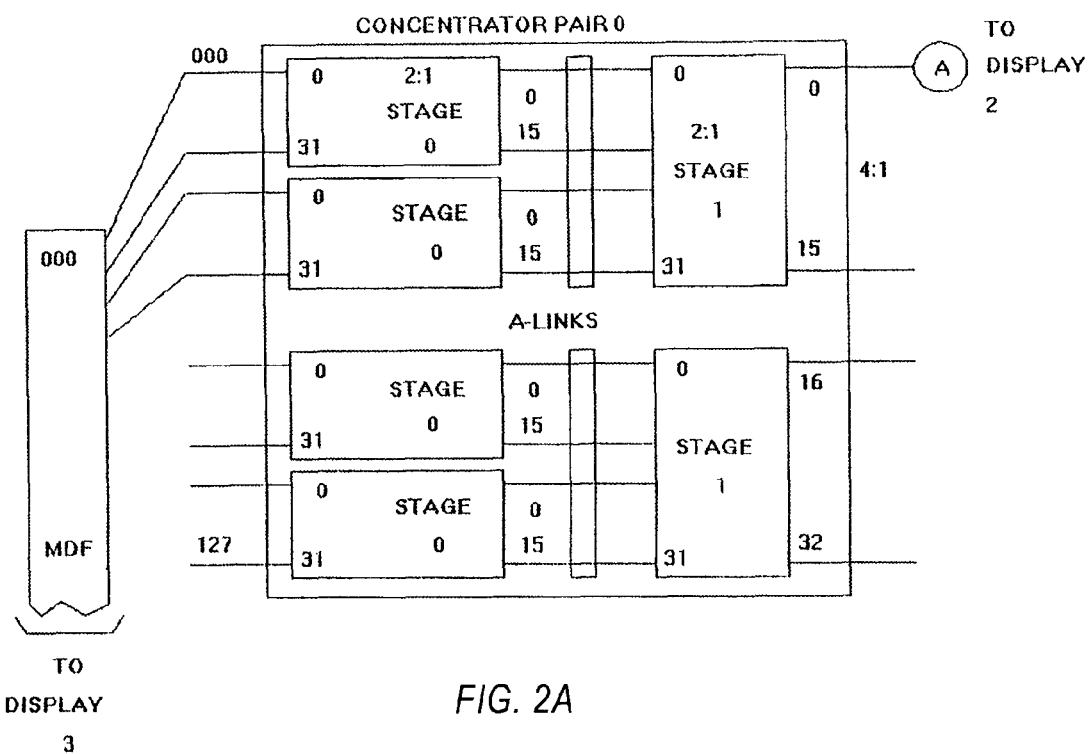
FIGS. 2A-D illustrate an interoffice line-to-line voice call path through the line unit of FIGS. 1A-D.
Figure 2B:
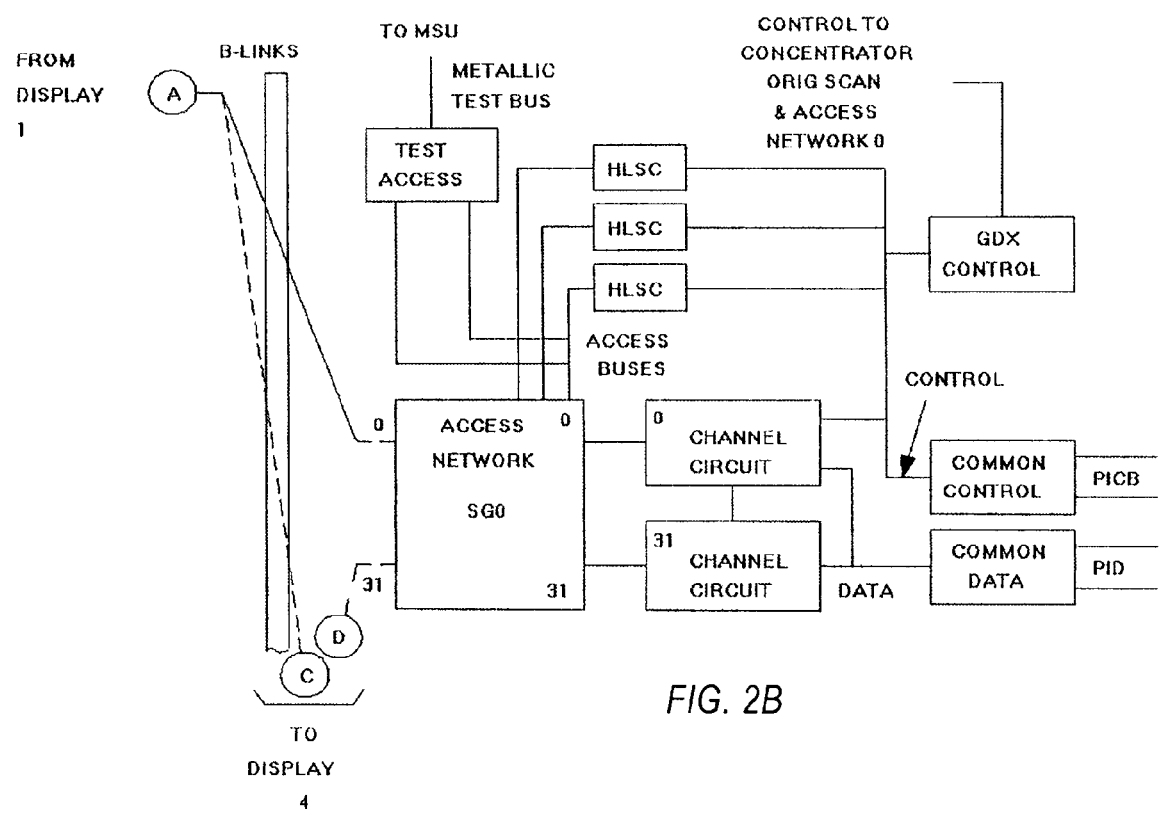
Figure 2C:
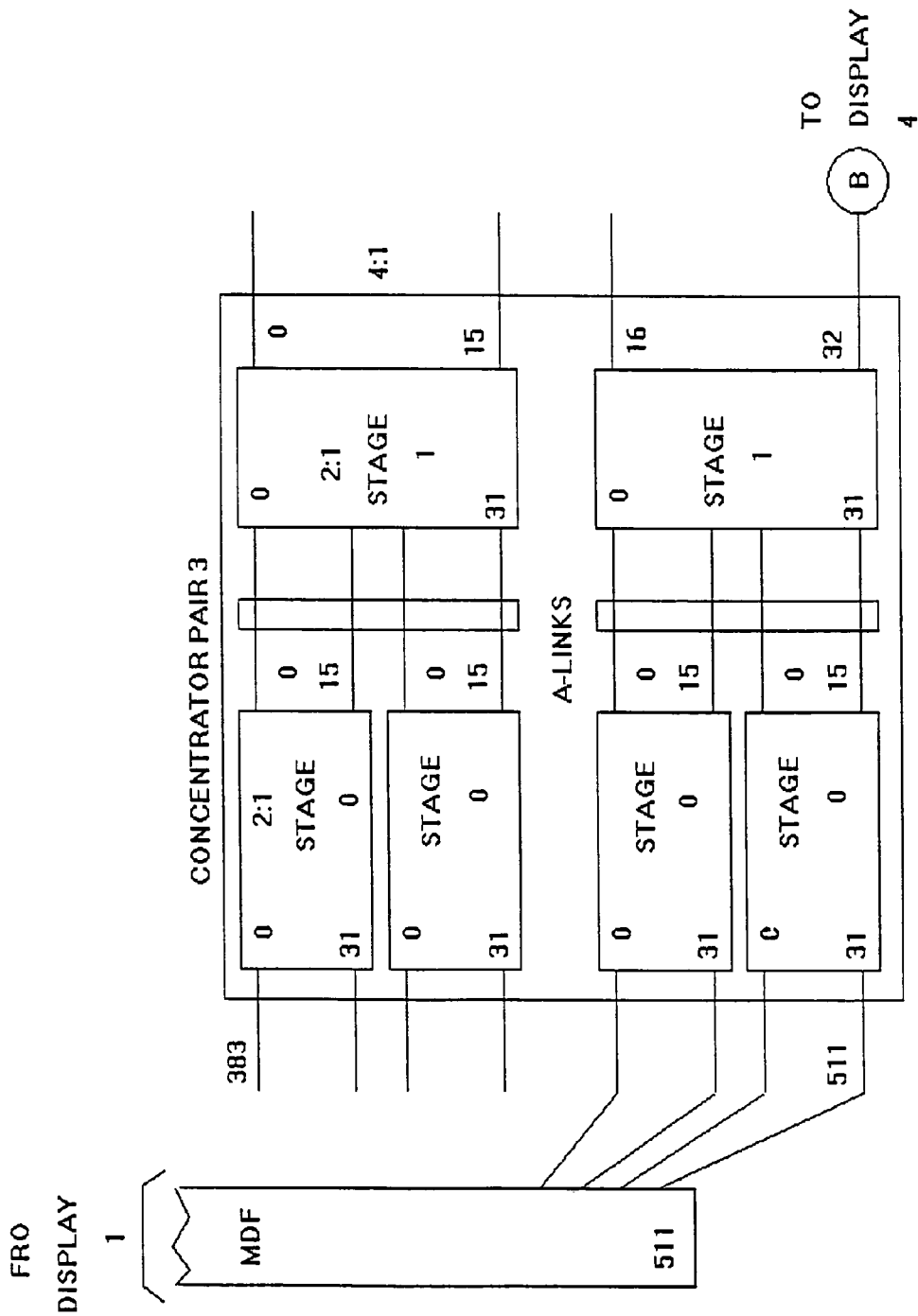
Figure 2D:
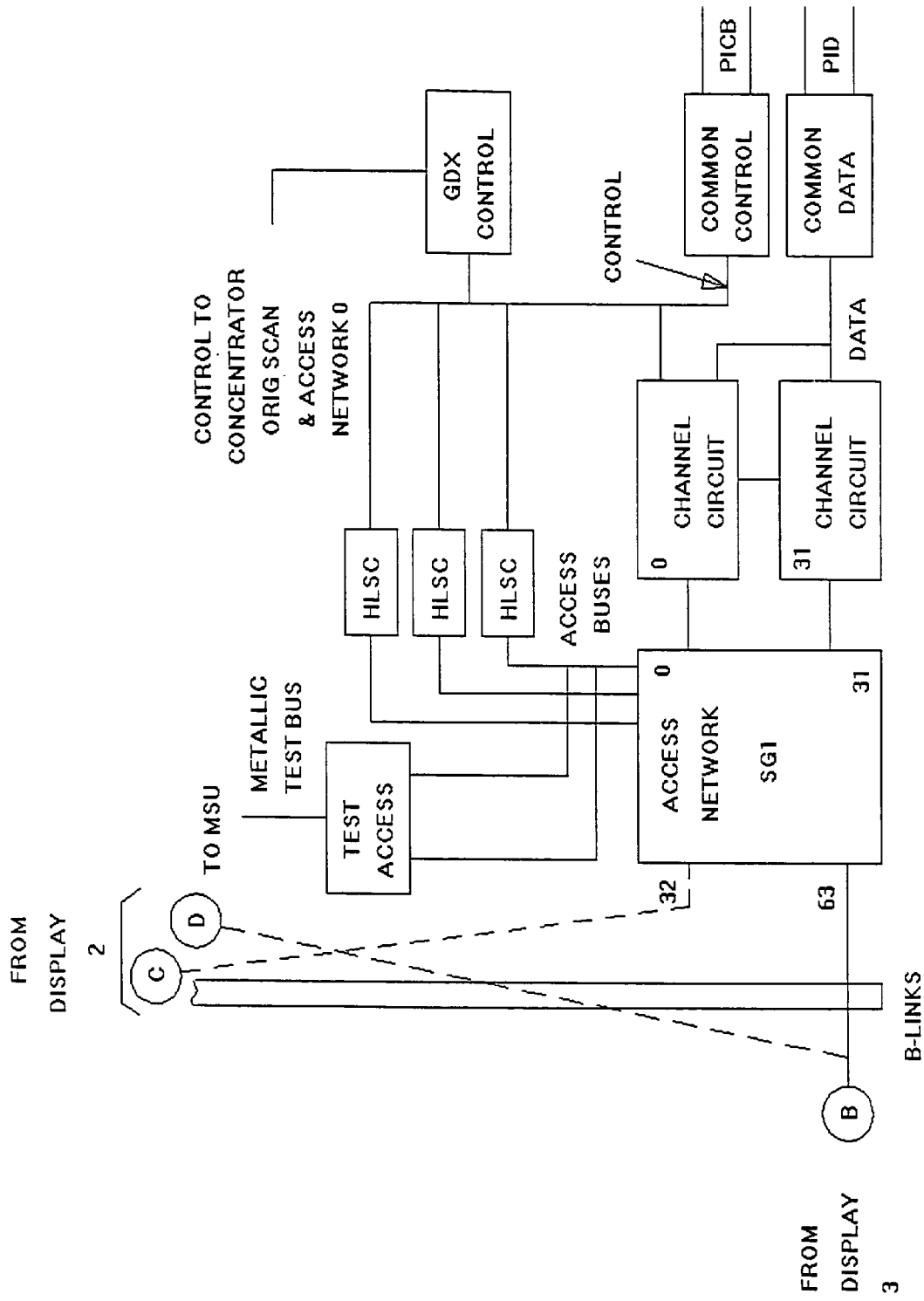

The concentrator network is made up of a series of solid-state gated-diode crosspoint (GDX) switching grids. The grids are divided into concentrator groups with two grids per group. The grids are made up of two half-grid circuits. An LU can be equipped with a maximum of 20 half-grid circuits. The 20 half-grids are grouped into 10 grids in 5 concentrator groups two of which are shown in FIGS. 1A and 1C.

A half-grid concentrator circuit provides a 2-stage switch matrix for concentration, secondary line protection, and origination scanning. A half-grid circuit can be divided into parts according to these functions as described in the following paragraphs.
   a. Secondary Protection: The half-grid concentrator provides additional protection for lines. Primary line protection is provided by gas tube protectors on the main distributing frame or in the optional line interface cabinet. The carbon block protector is also available as an alternative to the gas tube primary protection. The primary protector limits the potential on either conductor at the line terminal from +−215 volts to +−265 volts. Short-term transients are handled by the secondary protector which limits the potential to +−265 volts maximum.
   b. Scan Cutoff Crosspoint: Scan cutoff crosspoints sense line origination for up to 32 lines that connect to a half-grid concentrator.
   c. Low Voltage Destination and Source Control: This function provides a mechanism for selecting information on any of the 64 line scan points. Scan point information can be accessed by addressing 64 latches (flip-flops) that are organized in 8 groups of 8 bits.
   d. High Voltage Destination Control: This function provides a mechanism for selecting and operating crosspoints in the concentrator as follows:
      1. The crosspoints are the first and second-stage switches in the concentrator. Whenever a path through a concentrator is established in each stage of the concentrator, two crosspoints are operated; one for the line-ring lead and the other for the line-tip lead.
      2. The scan cutoff crosspoints are located in the tip and ring leads of lines served by a concentrator.
   e. Stage 0 GDX Matrix: The GDX switches provide the first stage (stage 0) of concentration in the half-grid. This stage of concentration connects the 32 lines terminated on the half grid circuit to 16-A links. An A-link is a path between the stage 0 matrix and the stage 1 GDX matrix. Each of the 32 lines has access to 4 of the A-links. Since there are 32 lines at the input, and only 16 A-links at the output, stage 0 provides a 2-to-1 concentration ratio.

f. Stage 1 GDX Matrix: This GDX matrix connects 16 A-links to 36 B-links. A B-link is a path between the half grid concentrator circuit and the access networks in each service group of the LU.

Even though each half-grid has 32 lines input and 32 B-links output, there is still a 2 to 1 concentration due to stage 0 only having an output of 16 A-links. The reason for providing 32 B-links is to provide a better distribution of the lines to the LU access network.

Since the half-grid circuits only provide a 2-to-1 concentration, the remainder of the concentration in the LU is provided by the backplane wiring of the B-links to the access networks. There are 64 inputs to the access network (32 per service group). The 512 outputs of the GDX half-grids are multipled together to the access network inputs in groups of eight. The switching system ensures that the crosspoints in the GDX matrix are never operated in a manner such that more than one GDX half-grid output is connected to the same access network input.

With the concentrator having a maximum input of 640 lines (32 lines times 20 half-grids) and the access network having only 64 inputs, the concentrator provides a 10-to-1 concentration ratio (640-to-64). Other concentration ratios can be provided by reducing the number of grids in the LU. With the 8-to-1 concentration ratio, 8 grids terminating a maximum of 512 lines are used (512-to-64). For a 6-to-1 concentration ratio, only 6 grids terminating a maximum of 384 lines are used (384-to-64). A 4-to-1 concentration is provided using 4 grids terminating a maximum of 256 lines (256-to-64).

Access Network

Each access network for the service groups SG0 or SG1 (FIG. 1B or 1D) is a space division matrix of crosspoints that resides behind the line concentrator and provides the following functions:

a. High-level service circuit (HLSC) access to the B-links
b. MTB access (linearized) to the B-links
c. Local test termination access to the B-links.
d. Battery reversal capability for each of the B-links.

An access network is provided in each SG and serves the associated 32 B-links and channel circuits. The access network is constructed using the same type of crosspoint (gated-diode crosspoint) that is used in the line concentrator. The power and control circuits are also similar. The access network crosspoints are electrically arranged into three identifiable groups.

1. A 32 by-8 matrix for B-link access to HLSCs and linearization circuits.
2. A 4-by-S matrix for access to test terminations.
3. 32 forward/reverse cross point network for connecting B-links to the channels.

The access network also contains a linearization circuit that is used whenever external test access through the MTB is required by an external bus and/or repair facility.

High-Level Service Circuit

The HLSC provides ringing current and operational tests on subscriber lines during call setup. These tests are as follows:

a. False Cross and Ground (FCC) Test: This test checks for foreign battery or ground within the LU concentrator.
b. Power Cross and Continuity Test: This test checks for power crosses and continuity from the stage 1 concentrator to the subscriber station set.
c. Coin Tests: Coin tests such as coin presence for coin collect and coin return are performed for coin lines.

The HLSC also performs self-diagnosis and is used as a resource in diagnosing other circuits such as the channel circuit and gated-diode switching network (concentrator group) in the LU.

Switching

The switches used in the concentrator groups are gated-diode switches and can withstand high voltages, voltage transients, and current surges; and can conduct and switch large currents on a line.

Channel Circuits

Channel circuits in the LU perform the following functions:

a. Convert analog signals from the B-links to PCM data
b. Decode PCM data from the common data circuits into analog signals
c. Perform line supervision scans (origination performed by concentrator)
d. Provide talking battery to the B-links
e. Provide software select per call loss capability of 0 or 2 dB in both the transmit and receive directions
f. Provide hybrid 2-wire to 4-wire conversion.

There are 64 channel circuits in the LU (32 per SG). Each channel circuit is directly associated with one B-link from the access network. It should be apparent from the above list of functions that the channel circuits perform the CODEC converter functions.

Common Data Circuits

Common data circuits sample PCM and supervision data from each of the channel circuits and distribute this data into a serial stream to synchronous packet time slots referred to as PIDBs. In the opposite direction, common data circuits distribute data from the PIDBs to the channel circuits. Each of the 32 channel circuits is associated with one of the 32 PIDB time slots. Each PIDB time slot supports one 64 kb/s capacity communication.

Common Control Circuits

Common control circuits in the LU distribute control data from the PICBs to the channel circuits, HLSCs, GDX control circuitry, and the access network. The following functions are performed by the GDX control circuit:

a. Distributes control to the concentrator groups
b. Receives scan information from the concentrator groups.

According to the preferred embodiment of the present invention a line card of the type described so far in relation to FIGS. 1A-D is modified and used in a new arrangement to advantageously overcome the above described problems. The line card detects non-telephone signals on a line and switches the line off the line-network for telephone services. The line card preferably switches the line to a higher speed data service, to provide the higher speeds to the customer and to off-load the resource intensitve data communication from the TELCO's switch network. This is now described with relation to FIG. 3.

Figure 3:
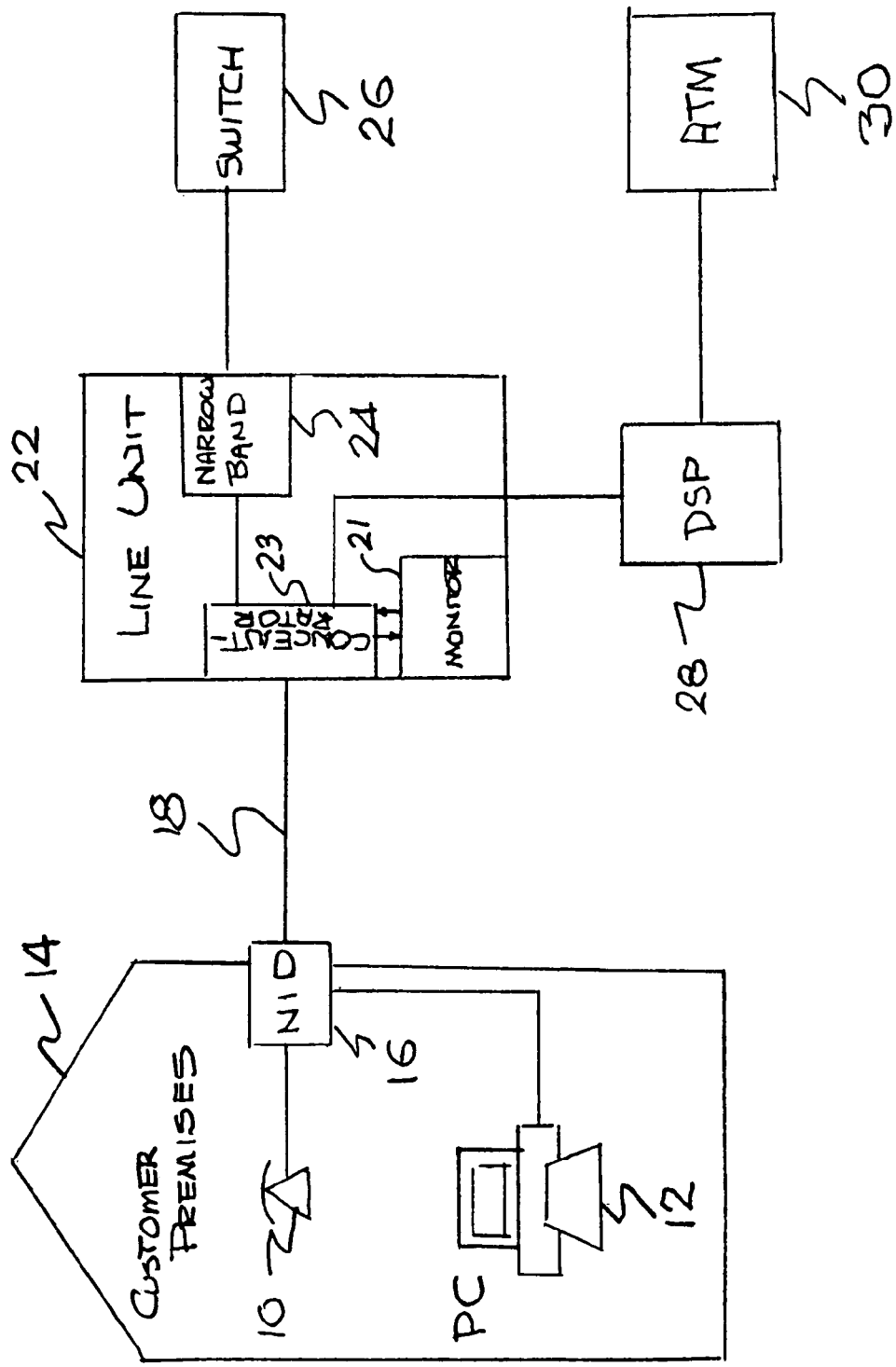
FIG. 3 is a block diagram of the architecture of a telephone network constructed to carry out the invention according to one illustrative preferred mode.

FIG. 3 shows in a block diagrammatic form the association between customer premises terminals and a telephone network, which may comprise a Public Switched Telephone Network. Referring to that figure, a telephone terminal 10 and a computer or PC 12 located in a customer premises 14 are connected to a network interface device (NID) 16. The NID marks the interface between the outside plant facilities and the customer premises equipment. It is connected by the local loop 18 to the input of a concentrator 20 in a line unit 22 of the general type described with respect to FIGS. 1A-D.

The conventional output of the concentrator network 23 connects to the conventional narrow band portion 24 of the enhanced line card 22. The narrow band portion represents that portion of the conventional line card shown in FIGS.

1A-D, which is beyond the concentrator and access network. It will be recognized that the concentrator and narrow band portion of the line card represent the same architecture and functionality as shown and described so far with respect to FIGS. 1A-D. The output port of the narrow band portion 24 of the line card 22 connects conventionally to the switch fabric of a central office or PBX type switch, shown at 26, and operates to support the conventional functionality of the line card. The narrowband portion 24 may connect to other types of conventional telephone equipment, for example through a loop carrier system or through an optical network unit.

The local loop also is connected or coupled via the concentrator network 23 to a monitor or signal detector 21. The concentrator network also provides a switched connection to a digital signal processor (DSP) 28 or other data service element(s), as discussed more later. The concentrator network 20, in FIG. 3, includes one of the access networks and one or more of the concentrator stages discussed above.

The monitor 21 is a programmable processor with storage, which is capable of monitoring and detecting one or more initiating or requesting signals appearing on the local loop or line 18. The initiating signal for which monitoring is performed may be one of one or more previously arranged and pre-identified signals or, in the alternative, may be a signal which is identifiable by being a signal which is not one of one or more specifically identified signals. Of particular note here, the monitor 21 detects a request signal that is in some way distinct and recognizable as different from various signals that are common in normal telephone communications. The distinctive signaling indicates a request for a service other than the normal switched telephone service, typically digital communication service at a bandwidth in excess of that provided through the narrowband elements of the line unit.

According to one preferred embodiment of the invention, the concentrator network 23 in the line card 22 is now provided with an additional connection to an adaptive digital signal processor (DSP) 28. This enhanced arrangement supports the additional and new functionality for the line card, as will presently be described. As is known to those skilled in the art, adaptive digital processors have powerful mathematical computational abilities, much more than normal computer microprocessors. Such processors have their own operating systems and programmability and operate at a high speed. DSPs are replacing the dedicated chipsets in modems and fax machines with programmable modules which can serve multiple functions, such as by way of example, fax machines, modems, teleconferencing devices, answering machines, voice digitizers, and proprietary electric telephones. Digital signal processors provide coding and decoding functions, adapted to the particular communication service which may be requested and the physical level signal protocol used over a customer's line. DSPs are made by Analog Devices, AT&T or Lucent, Motorola, NEC, and Texas Instruments, among others. The DSP 28 is also adapted to supply a hard wire through connection.

The DSP 28 delivers output to a broadband network edge device, here shown as an ATM edge device 30. The ITU (International Telecommunications Union) has selected ATM as the basis for the projected future broadband network, in view of its flexibility and suitability for both transmission and switching. ATM allocates bandwidth on demand, making it suitable for connection of voice, data, and video services. It is a wideband, low delay, packet-like switching and multiplexing concept that allows flexible use of the transmission bandwidth and is capable of working at data rates as high as 622.08 Mbit/s. Thus in the arrangement of the invention, the digital signal processor provides a two-way digital communication link to a fast data switch, such as the edge device 30 of an asynchronous transport mode (ATM) network. The data switch and associated data network provide a full range of digital communication services of various bandwidths or bit rates matching physical level signal protocols used over a customer's line.

According to this preferred embodiment of the invention, the initiation signal for which the monitor 22 maintains a watch, is an indication or request from the customer premises equipment that it desires more channel bandwidth than can be provided by the line card and switch. In the environment used in FIG. 3 for illustrative purposes, this initiation signal would most likely originate with the computer or PC 12. The initiating signal could be any character or signal which the PC was capable of generating to indicate its initiation request, and may be created by the software in the computer.

When the monitor 21 detects this initiation signal the monitor essentially interpretes the signal as a request for a communication channel having a bandwidth in excess of that available through the narrowband circuitry 24 of the line card 22 and switch 26. In response, the enhanced line card of the invention acts in a manner to insure that a satisfactory channel is provided. Preferably this is accomplished by using the switching available in the concentrator network 23 to create a hardwired connection from the computer or PC direct to the DSP 28 and/or the ATM edge device 30. This connection provides bandwidth on demand to the requesting computer, and avoids the previously described obstacles which are inherent in the conventional line card and switch combination. The bypass of the narrowband circuitry also off-loads the data communication from the telephone switch 26 to the ATM switch 30.

The broadband signal to be communicated has an unobstructed channel from the originating PC terminal 12 to the ATM edge device 30. The portion of that channel between the PC and the ATM edge device may be considered as virtually hard wired. The line card and it's CODEC function are completely by-passed without need to excite the switch 26 to register the digits dialed by the PC 12. In essence the initiating signal and its detection by the monitor 21 sets the state of the line card 22, and informs the narrowband portion of the line card that this is a data call going to a data network. At the same time the line card 22 is used in its usual fashion to perform its conventional narrow band function.

A further feature of the invention is its manner of providing a billing function for data calls. Since the line card gives access to the serving switch 26, a subset of the switch may be utilized to perform billing. The call initiating steps taken by the PC provide identification of the originating line and the dialed digits. At the time of initiation or recognition of the initiating signal by the monitor, the enhanced line card 22 senses that a different type of connection is desired. The monitor 21 and line card thereupon take the necessary action to set up that connection to the ATM edge device 30. As part of that function, data is sent to the CPU of the switch 26. That data may contain the number of the originating line, any dialed numbers, the time of initiation of the call, and the fact that the call was handed off to another port, i.e., to the ATM switch 30.

The end office switch 26 thereupon performs a two-line Automatic Message Accounting (AMA) journal entry on the existing switch journal in that end office. The journal entry is made by the CPU. When that call is torn down data is similarly sent to the CPU. The CPU thereupon initiates a similar tear-down message which is recorded on the AMA journal. The Revenue Accounting Office (RAC) is advised that there was a data call of a recorded bandwidth with the ATM device for a specified time period. The RAC will thereupon make a charge pursuant to the agreement with the customer. Since converted voice (analog to digital) is data after conversion, it is possible to use the apparatus and method of the invention to provide voice over the Internet service, without being subject to the handicaps encountered in the conventional providing of such service through the narrowband portion of the line card and the switch. Further, billing may be conveniently effected as just described.

Returning to FIG. 1, the drawings there also show somewhat more detail of an example of the modification of the line card in accord with the invention. As shown in FIGS. 1A and 1C, the line card further includes a scan point matrix switch corresponding to each of the concentrator pairs. Each such switch is coupled across each of the subscriber lines between the terminals thereof on the MDF and the front end of the first concentrator elements of one of the concentrator pairs. The scan point matrix switch does not interrupt any of the line connections to the concentrator. Instead, the scan point matrix switch selectively couples a signal processor to each line, to enable the signal processor to sample the signal(s) on the line.

The line card also includes a controller. The scan point matrix switches, the signal processor and the controller together form the elements of a monitor of the type shown at 21 in FIG. 3. The controller provides the intelligence for the monitor.

In operation, the controller controls the scan point matrix switches connected in front of the concentrator stages to cycle through the lines. During each cycle, the switch connects each line in turn to the signal processor. As the scan point matrix switches cycle through the various line connections, the switched connection to the signal processor dwells on each line for a finite period of time, to allow the signal processor to obtain a sample of the signal(s) on each line. From one or more such samples, the signal processor identifies the signal(s) if any present on each of the lines serviced through the particular line unit (LU). The signal processor provides data to the controller identifying the line state or condition and any signal(s) on each line to the controller.

From the data supplied by the signal processor, the controller can identify any line over which there has been a request for some service other than telephone service, as outlined above. The concentrator stages switch any active line through to the access network (FIG. 1B or FIG. 1D), in the normal manner. However, if there is a request for a high speed data service, for example, the controller supplies an instruction to the appropriate access network SG0 or SG1, to switch the line through one of its alternate ports going to the DSP and/or the ATM switch.

Typical operations of the system are now described with reference again to FIG. 3. If a subscriber or user in the premises 14 chooses to use the telephone 10 to make a conventional telephone call, the telephone goes off-hook and this is handled by the line card and switch in the conventional manner. The conventional narrow-band circuit is established from the telephone terminal 10 through the NID 16, the concentrator network 23, the narrow-band portion 24 of the line card 22, the switch 26, and the termination in the network.

However, if the computer or PC terminal 12 desires to initiate a communication using more bandwidth than is available through the narrow-band portion, a totally different methodology is used. In this situation the subscriber uses the PC or its modem to send the initiate signal and the telephone number or other address of the called party. The monitor detects the initiate signal and immediately communicates with the concentrator network 23. Preferably the monitor 21 directs the cross point switches in the concentrator stages and appropriate access network to switch the call to the digital signal processor or DSP 28. This creates a hard wired connection to the DSP 28.

According to one embodiment of the invention, this hard wired connection is passed through the DSP direct to the ATM edge device. Alternatively, there may be no DSP. Since the ATM edge device is hard wired all the way to the computer or PC there is only one factor limiting the ability of the conduit to carry the wideband signal used by the computer, namely the length of the conduit. The ATM edge device is by definition a bandwidth on demand device adapted to provide the physical level signal protocol used over the customer's line, i.e., the local loop. In certain instances the physical level signal protocol may be pre-set by the Telco supplying the modem to the PC user. As the connection is being set up the monitor directs to the CPU of the end office switch data indicating the identity of the calling line, the dialed number, and the time of connection set up. The end office switch then performs a two-line AMA journal entry. The same procedure is repeated at the time that the connection is torn down, and the Revenue Accounting Office or RAC is advised. The RAC attends to billing, which may be time-base, flat rate, or by bit.

According to another embodiment of the invention the hard-wired connection may be established only as far as the adaptive digital signal processor or DSP. According to this embodiment the DSP may perform the matching functions described for the ATM edge device. The DSP may be made a portion of the enhanced line card or housed in the same central office or elsewhere in the system. The DSP may be combined with the monitor. In such an embodiment the monitor may detect the protocol of the signal being received from the computer and signal the DSP so that it may immediately match the protocol. In all embodiments the wide band data switch and associated data network provide a full range of digital communication services of various bandwidths or bit rates as may be requested by individual subscribers.

While the foregoing has described what are considered to be preferred embodiments of the invention, it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

The invention claimed is:

1. A method comprising:
   receiving, from a customer premises terminal via a local link to a line unit in a switched telephone network, a request for a communication path to a destination;
   establishing a communication path from said local link through a concentrator network in said line unit;
   controlling a scanning device to selectively connect a detector to said local link, wherein the scanning device and detector are associated with said line unit;
   using said detector to identify a data sequence generated by said terminal;
   determining based on said data sequence that said request does not seek conversion in said line unit; and
   responsive to said determination, connecting said communication path from said concentrator network through a portion of said line unit around a converter in said line unit to a wide band data switch connected to a data network.

2. A method according to claim 1, wherein said converter comprises a CODEC.

3. A method according to claim 1, wherein said concentrator network includes a switching system.

4. A method according to claim 3, wherein said switching system provides hard wired switching.

5. A method according to claim 3, wherein the switching in said switching system provides hard wired switching between said terminal and said wide band data switch.

6. A method according to claim 3, wherein said switching system is connected to a digital signal processor (DSP).

7. A method according to claim 3, wherein said switching system comprises gated-diode cross point (ODX) switching.

8. A method according to claim 3, wherein said switching system comprises cross point switching.

9. A method according to claim 6, wherein said digital signal processor is indirectly associated with said line unit.

10. A method according to claim 6, wherein said digital signal processor is directly associated with said wide band data switch.

11. A method according to claim 6, wherein said digital signal processor (DSP) is integrated with said line unit.

12. A method according to claim 1, further including the steps of: signaling a central processing unit (CPU) controlling a telephone network switch to effect an entry in a journal of said telephone network switch, and using said entry for billing for the communications path set up in response to said receiving step.

13. A method according to claim 1, wherein said connecting step through a portion of said line unit around a converter therein to a wide band switch is a virtual hard wired connection.

14. A method according to claim 1, wherein said connection to said wide band network is through an Asynchronous Transfer Mode (ATM) edge device.

15. A method according to claim 1, wherein said line unit comprises a line card.

16. A method according to claim 1, wherein the scanning device includes scan point matrix switches, and wherein the detector includes a signal processor and a controller.

17. A method comprising:
receiving, from a customer premises terminal via a local link to a line unit in a switched telephone network, a request for a communication path to a destination;
establishing a communication path from said local link through a concentrator network in said line unit;
controlling a scanning device to selectively connect a detector to said local link, wherein the scanning device and detector are associated with said line unit;
using said detector to identify a data sequence generated by said terminal;
detecting, based on said data sequence, that said request seeks bandwidth in excess of that available through said line unit; and
responsive to said detection connecting said communication path from said concentrator network through a portion of said line unit around a converter in said line unit to a wide band data switch connected to a data network.

18. A method according to claim 17, wherein said concentrator network of said line unit includes a switching system.

19. A method according to claim 18, wherein said switching system provides hard wired switching.

20. A method according to claim 18, wherein the switching in said switching system provides hard wired switching between said terminal and said wide band data switch.

21. A method according to claim 18, wherein said switching system is connected to a digital signal processor (DSP).

22. A method according to claim 21, wherein said digital signal processor is indirectly associated with said line unit.

23. A method according to claim 21, wherein said digital signal processor is directly associated with said wide band data switch.

24. A method according to claim 17, wherein the scanning device includes scan point matrix switches, and wherein the detector includes a signal processor and a controller.

25. A line unit for a switched telecommunications network comprising trunked together program controlled switches connected to subscriber premises by local links connected to the line unit, said line unit comprising:
a line concentrator network for connection to a plurality of local links, said concentrator network including switches, and a high bandwidth port;
customer interface hardware;
a converter for converting signals on the plurality of local links to digital signals at a predetermined narrowband bit-rate;
a scanning device that is configured to sequentially connect to at least one of said plurality of local links; and
a monitor in communication with said scanning device, wherein the monitor is configured to, upon detecting a pre-designated signal on a local link connected within said sequence, generate an output signal to said concentrator network to cause said concentrator network to provide a connection to said port for signals on said link.

26. A line unit according to claim 25, wherein said concentrator network comprises solid state switches.

27. A line unit according to claim 25, wherein the concentrator switches create a hard wired connection to said port for said link.

28. A line unit according to claim 25, wherein said line unit delivers said signals on said link to said port in unconverted format.

29. A line unit according to claim 25, including a digital signal processor with a programmed controller providing coding and decoding functions adapted to a service requested by the detected signal and the physical level protocol used over said local link.

30. A method comprising:
receiving, from a customer premises terminal via a local link to a line unit and telephone network switch in a switched telephone network, a request for a communication path to a destination;
establishing a communication path from said local link through a concentrator network in said line unit;
controlling a scanning device to selectively connect a detector to said local link, wherein the scanning device and detector are associated with said line unit;
using said detector to identify a data sequence generated by said terminal;
determining based on said data sequence that said request does not seek conversion in said line unit;
responsive to said determination, connecting said communication path from said concentrator network through a portion of said line unit around a converter in said line unit to a wide band data switch connected to a data network; and
signaling a central processing unit (CPU) controlling said telephone network switch to effect an entry in a journal of said telephone network switch, and using said entry for billing for the communications path set up in response to said requesting step.

* * * * *